United States Patent [19]

Usui et al.

[11] Patent Number: 5,087,083

[45] Date of Patent: Feb. 11, 1992

[54] CONNECTOR FOR CONNECTING SMALL DIAMETER PIPE

[75] Inventors: Masayoshi Usui, Numazu; Katsushi Washizu, Nagasawa, both of Japan

[73] Assignee: Usui Kokusai Sangyo Kaisha Ltd., Japan

[21] Appl. No.: 617,406

[22] Filed: Nov. 21, 1990

Related U.S. Application Data

[63] Continuation of Ser. No. 346,551, May 2, 1989, abandoned.

[30] Foreign Application Priority Data

May 28, 1988 [JP] Japan .................. 63-131278

[51] Int. Cl.⁵ ............................................. F16L 13/02
[52] U.S. Cl. .................................... 285/286; 285/348; 285/423; 285/906
[58] Field of Search ................. 285/21, 22, 286, 356, 285/347, 911, 348, 423, 906

[56] References Cited

U.S. PATENT DOCUMENTS

| | | | |
|---|---|---|---|
| 658,045 | 9/1900 | Shaw | 285/356 X |
| 1,116,609 | 11/1914 | Mueller et al. | 285/356 X |
| 1,204,728 | 11/1916 | Arena | 285/356 X |
| 1,702,241 | 2/1929 | Buckley | 285/356 X |
| 2,485,960 | 10/1949 | Donahue | 285/120 |
| 2,782,058 | 2/1957 | Clingman et al. | 285/356 X |
| 3,201,154 | 8/1965 | Holingren | 285/286 |
| 3,677,580 | 7/1972 | Klanke | 285/286 X |
| 3,787,945 | 1/1974 | Pasek et al. | 29/157.4 |
| 3,953,057 | 4/1976 | Petzetakis | 285/156 X |
| 4,047,739 | 9/1977 | Aitken | 285/369 X |
| 4,074,703 | 2/1978 | Smith | 285/356 X |
| 4,142,843 | 3/1979 | Kish | 285/382.4 X |
| 4,227,639 | 10/1980 | Blumenberg | 285/286 X |
| 4,245,858 | 1/1981 | Cox | 285/286 X |
| 4,260,181 | 4/1981 | Curtin | 285/21 X |
| 4,346,918 | 8/1982 | Lycan | 285/286 X |
| 4,452,097 | 6/1984 | Junkel | 285/406 X |
| 4,730,856 | 3/1988 | Washizu | 285/319 |
| 4,770,447 | 9/1988 | Umehara | 285/189 |
| 4,775,170 | 10/1988 | Usui et al. | 285/24 |
| 4,776,616 | 10/1988 | Umehara et al. | 285/156 |
| 4,810,011 | 3/1989 | Hashimoto | 285/116 |

FOREIGN PATENT DOCUMENTS 1036950 7/1966 United Kingdom .

*Primary Examiner*—Dave W. Arola
*Attorney, Agent, or Firm*—Anthony J. Casella; Gerald E. Hespos

[57] ABSTRACT

There is disclosed a connector for connecting a small diameter pipe. The connector includes: a connector body provided with an enlarge diameter chamber provided with a stepped portion; a pipe having an annular collar wall and engaging with the stepped portion; a sealing member fitted to the annular collar wall; and a sleeve member having a collar wall. An end peripheral portion of a cylindrical wall defining the enlarged diameter chamber into which the pipe connecting end is incorporated is welded to the sleeve member collar wall.

There is also disclosed a connecting method comprising the steps of: fitting the sealing and sleeve members to the pipe collar wall; incorporating the connecting end of the pipe fitted with the sealing and sleeve members into the enlarged diameter chamber; and welding the sleeve member collar wall to the cylindrical wall in a state where the pipe collar wall engages with the stepped portion.

8 Claims, 2 Drawing Sheets

PRIOR ART

CONNECTOR FOR CONNECTING SMALL DIAMETER PIPE

This application is a continuation of application Ser. No. 346,551 filed May 2, 1989, and now abandoned.

BACKGROUND OF THE INVENTION

1. Field of the Invention

The present invention is directed to improvements of a connector for and a method of connecting a resinous pipe having a relatively small diameter or a metallic tube having a diameter of approximately 30 m/m or less, which is arranged as a supply passageway for supplying the air and oil generally to an automobile or a variety of machineries, equipments and so forth.

2. Description of the Prior Arts

This type of conventional connector for connecting a metallic tube is, as exemplified in FIG. 6, constructed in the following manner. An inner peripheral surface of a cylindrical wall (11') receiving the intrusion of the connecting end of a pipe (T1) and also constituting an enlarged diameter chamber (13) in an as-intruded state is heat-welded (W) by use of a metallic soldering material to the enlarged diameter chamber (13) provided with a stepped portion and communicating with a communication bore (12) formed in an axial core interior of a metallic connector body (11) assuming a desired configuration. Apropos of the resinous tube, as exemplified in FIG. 7, an enlarged diameter chamber (23) provided with the stepped portion communicates with a communication bore (22) formed in the axial core interior of a connector body (21). A pipe (T2) is formed at its end with a collar wall (T2') extending outwards and fitted with a sealing ring member (24) provided behind the collar wall and with a sleeve-like fastening nuts member (25). A cylindrical wall (21'), into which the connecting end of pipe (T2) is incorporated, constitutes enlarged diameter chamber (23) of connector body (21). In this configuration, a threaded surface of a cylindrical wall (21') is screw-fastened through fastening nut member (25) to enlarged diameter chamber (23).

There arise, however, some problems inherent in this type of prior art connector. In the case of the metallic tube, heat-welding (W) by use of the metallic soldering material at high temperatures does not permit the use of the pipe previously electroplated with a typical anti-corrosive film such as zinc or a zinc alloy. The film processing is effected inevitably after the solder-welding has been carried out. For this reason, a variety of bending configurations that pipe (T1) may assume entail the troublesome film processing. This in turn results in a remarkable decline in workability. Besides, during the film processing it is impossible to keep constant both an inter-pole distance and a current density, thereby causing an ununiform thickness of the film. This also causes deterioration in quality. Furthermore, a good deal of processing time is required for securing the least film thickness.

On the occasion of the resinous tube, the screw-processing with respect to cylindrical wall (21') constituting enlarged diameter chamber (23) and fastening nut member (25) is also troublesome. The formation of a relatively large screw-fitting portion generally makes longer cylindrical wall (21') and nut member (25) as well. Where the tube is placed for a long period of time under an oscillating condition, an oft-happened problem is a leakage from the slackened screw-fitting portion.

SUMMARY OF THE INVENTION

It is a primary object of the present invention to provide a connector for and a method of connecting a small diameter pipe which are capable of eliminating the heat-welding by use of a metallic soldering material at high temperatures even in the case of a metallic tube, employing a straight pipe previously eletroplated with a film, securing the sufficient quality with the uniform film in addition to the simplified film processing, shortening the connecting portions by making the screw-processing unnecessary even in the case of a resinous tube, and finally eliminating an anxiety for a leakage from the slackened connecting portions during a long stretch of placement under the oscillating condition.

To this end, according to one aspect of the present invention, there is provided a connector for connecting a small diameter pipe, comprising: a resinous connector body formed, in its axial core interior, with an enlarged diameter chamber provided with a stepped portion and communicating with a communication bore; a pipe having an annular collar wall formed at its top end or in the vicinity thereof to extend outwards and engaging with the stepped portion of the enlarged diameter chamber into which the pipe is incorporated; an elastic sealing member fitted to a rear surface of the annular collar wall in the enlarged diameter chamber; and a resinous sleeve member having a collar wall at its rear end and fitted behind the sealing member, characterized in that when fitting the sleeve member, the sealing member is pressed by the sleeve member, and an end peripheral portion of a cylindrical wall which defines the enlarged diameter chamber is welded to the collar wall of the sleeve member.

According to another aspect of the invention, there is provided a method of connecting a small diameter pipe, comprising the steps of: fitting an elastic sealing member and sequentially a resinous sleeve member having a collar wall at its rear end to a rear surface of an annular collar wall provided at the pipe top end or in the vicinity thereof; incorporating the connecting end of the pipe fitted with the sealing member and the sleeve member into an enlarged diameter chamber provided with a stepped portion and communicating with a communication bore formed in the axial core interior of a resinous connector body; and welding the collar wall of the sleeve member to an end peripheral portion of a cylindrical wall which defines the enlarged diameter chamber of the connector body in a state where the pipe collar wall engages with the stepped portion of the enlarged diameter chamber after pressing the sealing member by use of the sleeve member.

In accordance with the connector and the connecting method of the invention, bonding agents are applied beforehand to welding surfaces of the connector body and of the sleeve member, or such welding surfaces are roughly formed, or a separately provided ring is interposed between the top end surface of the sleeve member and the sealing member, thus effecting the welding process.

The connector according to the present invention is constructed with facility in association with the above-described connecting method. Therefore, on the occasion of connecting the pipe, the rear surface of the annular collar wall of the pipe is previously fitted with the sealing member and the sleeve member. Subsequently, the sealing member is pressed by the sleeve member. The connecting part of the pipe is incorporated into the enlarged diameter chamber of the connector body by engaging the pipe collar wall with the stepped portion thereof. In this state, the collar wall of the sleeve member is welded to the end peripheral portion of the cylindrical wall which defines the enlarged diameter chamber of the connector body.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

Figure 1:
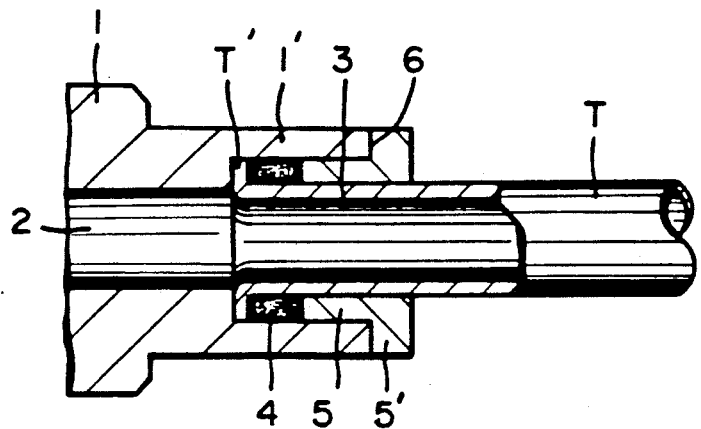
FIG. 1 is a vertical sectional view of a connector, with parts broken away for clearly showing a connecting situation, for connecting a small diameter pipe, the connector being constructed by a connecting method in accordance with one embodiment of the present invention.

Turning to FIGS. 1 through 5, a connector body generally designated at (1) is formed of resin such as polyacetal by the injection molding to assume a desired configuration. Connector body (1) is formed, at its top end, with an enlarged diameter chamber (3) provided with a stepped portion and communicating with a communication bore formed in the axial core interior. A pipe (T1) composed of a resinous tube or a metallic tube like, e.g., a carbon steel pipe includes an outwardly extending annular collar wall (T') provided at its top end or in the vicinity thereof. The rear surface of pipe (T) is fitted with an elastic sealing member (4) formed of silicon rubber or the like and with a sleeve member (5) formed of resin, e.g., polyacetal and positioned behind the sealing member, the sleeve member also including a collar wall (5') at its rear end. Based on this construction, the connecting part of pipe (T) is incorporated into the enlarged diameter chamber. The reference numeral (6) denotes a welding portion based on, e.g., an ultrasonic welding method. Welding portion (6) extends over a contact surface between an end peripheral portion of a cylindrical wall (1') which defines an enlarged diameter chamber (3) of a connector body (1) and a collar wall (5') of sleeve member (5) in such a configuration that collar wall (T') engages with the stepped portion of enlarged diameter chamber (3) by pressing sealing member (4) with sleeve member (5) after incorporating the pipe end thereinto.

Figure 2:
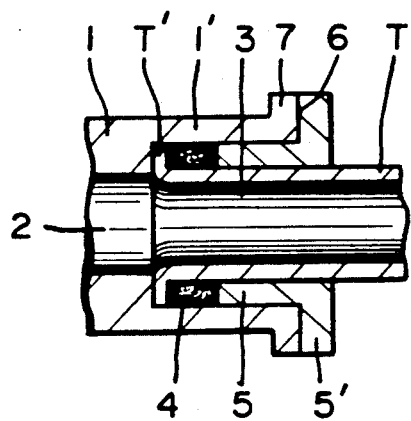
FIGS. 2 to 5 are vertical sectional views, each corresponding to FIG. 1, of the connectors with some parts broken away which are constructed by the same connecting method, illustrating different embodiments of the invention.
Figure 3:
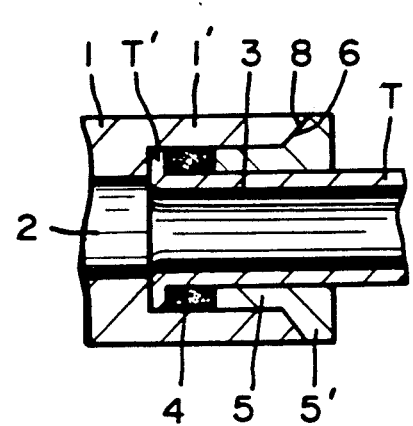
Figure 4:
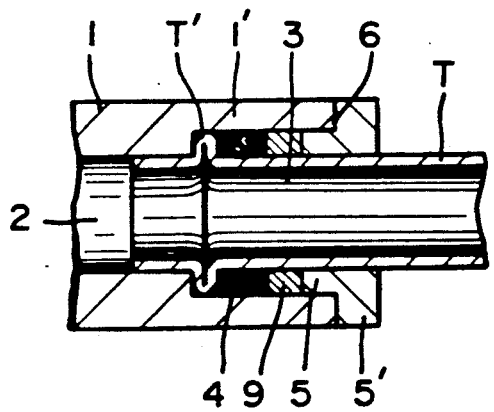
Figure 5:
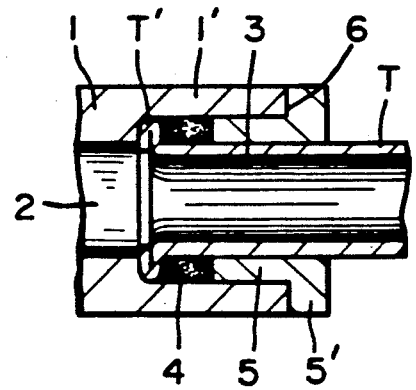
Figure 6:
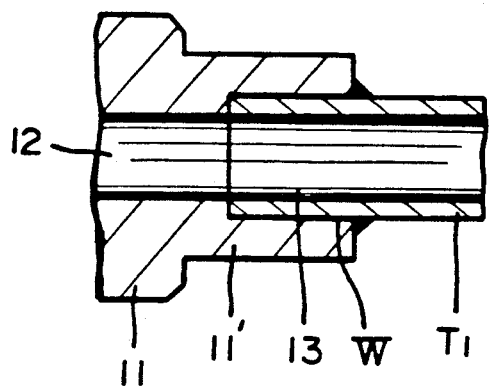
FIGS. 6 and 7 are vertical sectional views of conventional connectors with some parts broken away for clearly showing the connecting situations.
Figure 7:
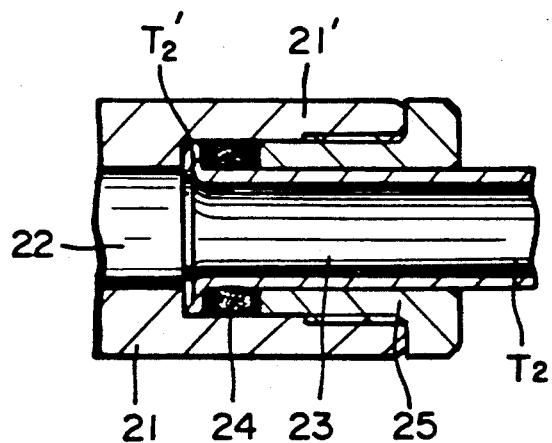

Referring to FIG. 2, the numeral (7) represents a collar wall contiguous to collar wall (5') of sleeve member (5) which is provided at the end peripheral portion of cylindrical wall (1'). Collar wall (7) provides a sufficient area for welding. Turning attention to FIG. 3, the numeral (8) stands for an inclined surface shaped on welding portion (6). Interposed between the top end surface of sleeve member (5) and sealing member (4), as illustrated in FIG. 4, is a separately provided heat-resistant resinous or ceramic ring (9) for ameliorating sealing properties by preventing the sealing member from squeezing out and also hindering the heat from being transferred to the sealing member during the heat welding. Bonding agents may be applied beforehand to welding surfaces of connector body (1) and of sleeve member (5); or alternatively the welding surfaces are roughly formed in advance of effecting the welding process.

As discussed above, in the connector for and the method of connecting the small diameter pipe according to the present invention, the end peripheral portion of cylindrical wall (1') of connector body (1) is welded to collar wall (5') of sleeve member (5) after the intrusion of pipe (T) has been effected. This arrangement, even in the case of a metallic tube, eliminates the heat welding process by use of a metallic soldering material at high temperatures, and at the same time permits the use of straight pipe (T) previously electroplated with a film. In addition to this simple film processing, the sufficient quality with the uniform film can be secured. Besides, even in the case of a resinous tube, the screw processing is not required, and the mutual connecting portion is allowed to decrease in length. It is also feasible to eliminate the anxiety for a leakage from the slackened connecting portion during a long stretch of placement under an oscillating condition. Thus, the remarkably useful connector and connecting method can be obtained.

Although the illustrative embodiment of the present invention have been described in detail with reference to the accompanying drawings, it is to be understood that the present invention is not limited to those precise embodiments. Various changes or modifications may be effected therein by one skilled in the art without departing from the scope or spirit of the invention.

What is claimed is:

1. A connector for connecting a small diameter pipe, comprising:

a resinous connector body having a rear axial end, a cylindrical wall extending forwardly from the rear axial end and defining an enlarged diameter chamber of substantially uniform cylindrical shape extending into the rear axial end and communicating with a communication bore defined in the connector body spaced from the rear axial end, the communication bore defining a smaller diameter than the enlarged diameter chamber, a stepped portion defined in the enlarged diameter chamber adjacent the communication bore;

a metal pipe having a top end, an annular collar wall formed in proximity to the top end, said top end and said annular collar wall being disposed in the connector body, said annular collar wall including opposed front and rear surfaces, said front surface engaging with said stepped portion of said enlarged diameter chamber;

an elastic sealing member fitted to the rear surface of said annular collar wall and in said enlarged diameter chamber;

a heat resistant ring fitting in the enlarged diameter meter chamber and adjacent to the elastic sealing member;

a resinous sleeve member having a top end with substantially uniformly cylindrical inner and outer surfaces, the inner surface of the top end being fitted over the pipe and the outer surface of the top end being fitted in said enlarged diameter chamber, said sleeve member further having a rear end defining an outwardly extending collar wall having a top face disposed in abutting face-to-face contact with the rear axial end of the resinous connector body, said top end of said resinous sleeve member having a length such that said sealing member is pressed by said heat resistant ring when said top face of said collar wall is in face-to-face contact with the rear axial end of the connector body; and a welding portion defining an integral resinous connector between the top face of the collar wall of the resinous sleeve and the rear axial end of the resinous connector body for sealing the pipe to the connector body, whereby heat generated by welding the resinous connector body to the resinous sleeve member is sufficiently low to avoid damage to the pipe.

2. The connector as set forth in claim 1, wherein said ring is formed of heat-resistant resin.

3. The connector as set forth in claim 1, wherein said end peripheral portion of said cylindrical wall of said connector body is provided with a collar wall contiguous to said collar wall of said sleeve member.

4. The connector as set forth in claim 1, wherein said welding portion between said end peripheral portion of said cylindrical wall and said collar wall of said sleeve member is formed with an inclined surface.

5. The connector as set forth in claim 1, wherein said connector body and said sleeve member are formed of polyacetal.

6. The connector as set forth in claim 1 wherein the pipe is electroplated with a protective film thereon.

7. The connector as set forth in claim 1 further comprising a bonding agent intermediate the welding surfaces of the connector body and the sleeve member respectively.

8. The connector as set forth in claim 1 wherein said ring is formed of ceramic material.

* * * * *